United States Patent
Coleman et al.

(10) Patent No.: US 11,568,028 B2
(45) Date of Patent: *Jan. 31, 2023

(54) DATA WATERMARKING AND FINGERPRINTING SYSTEM AND METHOD

(71) Applicant: LiveRamp, Inc., San Francisco, CA (US)

(72) Inventors: Arthur Coleman, Carmel Valley, CA (US); Martin Rose, Superior, CO (US); Tsz Ling Christina Leung, San Mateo, CA (US); Michael Anderson, Conway, AR (US)

(73) Assignee: LiveRamp, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/542,686

(22) Filed: Dec. 6, 2021

(65) Prior Publication Data

US 2022/0164418 A1    May 26, 2022

Related U.S. Application Data

(62) Division of application No. 16/086,577, filed as application No. PCT/US2017/023104 on Mar. 18, 2017, now Pat. No. 11,216,536.

(60) Provisional application No. 62/311,289, filed on Mar. 21, 2016.

(51) Int. Cl.
| | | |
|---|---|---|
| H04L 29/06 | (2006.01) | |
| G06F 21/16 | (2013.01) | |
| G09C 1/00 | (2006.01) | |
| H04L 9/06 | (2006.01) | |
| G06F 16/41 | (2019.01) | |
| G06N 20/00 | (2019.01) | |

(52) U.S. Cl.
CPC .............. *G06F 21/16* (2013.01); *G06F 16/41* (2019.01); *G06N 20/00* (2019.01); *G09C 1/00* (2013.01); *H04L 9/0643* (2013.01); *G06F 2221/0733* (2013.01); *G06F 2221/0737* (2013.01); *H04L 2209/608* (2013.01)

(58) Field of Classification Search
CPC .. G06F 21/16; G06F 2221/0733; G06N 20/00
USPC .......................................................... 726/36
See application file for complete search history.

(56) References Cited

U.S. PATENT DOCUMENTS

| | | | |
|---|---|---|---|
| 2010/0250497 A1* | 9/2010 | Redlich ................ | H04L 63/105 707/661 |
| 2015/0227925 A1* | 8/2015 | Filler .................. | G06Q 20/367 382/100 |

* cited by examiner

*Primary Examiner* — Evans Desrosiers

(57) ABSTRACT

A system for applying fingerprinting/watermarking of consumer data, and analyzing "wild files" of consumer data to assign a guilt score for a particular party who may have leaked the data, allows the owner of data sources ("Data Owners") to identify and assert ownership of textual data that has been distributed outside of their firewall in the clear (i.e., without encryption), either intentionally or unintentionally, and assign guilt to parties misusing the data. The system can be used by Data Owners who transmit, lease, or sell data to individuals or organizations ("Trusted Third Parties" or "TTPs") to recognize and assert ownership of their data in the case where one or more TTPs leaks the data (the leaked file is defined as a "Leaked Subset") into the hands of others ("Bad Actors") who either knowingly or unknowingly use the data illegally.

18 Claims, 8 Drawing Sheets

Subset 2 ($S_1$)

| Record # | | | | | | | | |
|---|---|---|---|---|---|---|---|---|
| 1 | | | | | | | | |
| 2 | | | | | | | | |
| 3 | | | | | | | | |
| 4 | | | | | | | | |
| 5 | | | | | | | | |
| 6 | | | | | | | | |
| 7 | | | | | | | | |
| 8 | | | | | | | | |
| 9 | | | | | | | | |
| 10 | | | | | | | | |
| 11 | | | | | | | | |
| 12 | | | | | | | | |
| 13 | | | | | | | | |
| 14 | | | | | | | | |
| 15 | | | | | | | | |

Wild 1 ($W_1$)

| Record # |
|---|
| 1 |
| 5 |
| 9 |
| 10 |
| 13 |
| 15 |
| 35 |

Subset 2 ($S_2$)

| Record # | | | | | | | | |
|---|---|---|---|---|---|---|---|---|
| 1 | | | | | | | | |
| 3 | | | | | | | | |
| 5 | | | | | | | | |
| 7 | | | | | | | | |
| 9 | | | | | | | | |
| 11 | | | | | | | | |
| 13 | | | | | | | | |
| 15 | | | | | | | | |
| 17 | | | | | | | | |
| 19 | | | | | | | | |
| 21 | | | | | | | | |
| 23 | | | | | | | | |
| 25 | | | | | | | | |
| 27 | | | | | | | | |
| 29 | | | | | | | | |
| 31 | | | | | | | | |
| 33 | | | | | | | | |
| 35 | | | | | | | | |

Is $Pr\{G_1 | S_1\} > Pr\{G_2 | S_2\}$?

QUESTION
Given two agents, two known data sets and a third suspect data set, can you determine who was most likely to have leaked the data?

INTUITION
The less overlap between two data sets $S_1$ and $S_2$, the easier it is to assign guilt if data is given to a third party

GOAL
To fingerprint records in a way that maximizes the statistical distance between $Pr\{G_1 | S_1\}$ and $Pr\{G_2 | S_2\}$

*FIG. 1*

DATA WATERMARKING AND FINGERPRINTING SYSTEM AND METHOD

CROSS-REFERENCE TO RELATED APPLICATIONS

This application is a divisional of U.S. patent application Ser. No. 16/086,577, filed on Sep. 19, 2018, which was a national-stage of international application no. PCT/US2017/023104, filed on Mar. 18, 2017, which claimed the benefit of U.S. provisional patent application No. 62/311,289, filed on Mar. 21, 2016. Each such application is incorporated herein by reference in its entirety.

FIELD

The field of the invention is the watermarking and fingerprinting of data sets to determine if data has been inappropriately copied or used. Watermarking is the marking of data in a manner not readily detectable by another party such that the data may be later identified. Salting is one of the techniques of adding information to data to create a watermark. Fingerprinting, also known as zero-footprint watermarking because it does not alter the data being watermarked, is the process of producing from a data set a much shorter set that nevertheless identifies the original data set. This invention addresses issues of data privacy and forensic analysis of data sets such as database tables, text files, and data feeds using a system of watermarking/fingerprinting techniques and guilt assignment.

BACKGROUND

Data leakage may be defined as the surreptitious use of data or the tampering with data by someone other than an owner or authorized user. Data leakage is estimated to be a multi-trillion dollar problem by 2019. Data leakage solutions, which currently represent about $1 billion per year in sales, have existed for some time. These solutions prevent data from leaking outside an organization's firewall, or encrypt it when it leaves the firewall and moves through open networks "on the wire." Solutions have existed for asserting ownership of graphical, video, audio, or document (i.e. text or pdf) data once that data is actually exposed in the clear outside the firewall. Organizations use these watermarking solutions, as they are known, to protect their IP from misuse. They allow the data owner to recover damages for unlicensed use because they can use the watermark in a court of law as evidence of ownership and copyright infringement. At the same time, the fact that such legal remedies exist deters individuals or groups hoping to acquire and then use that copyrighted material for free.

Sadly, data leakage of text and database files, whether passed in the clear or decrypted at the point of use, has remained an unsolved problem. Owners of consumer data ("Data Owners") often give, lease, or sell their data to individuals or organizations ("Trusted Third Parties" or "TTPs") that are trusted to use that data only in a legal fashion, following contractual requirements or data-handling regulations, such as Regulation B in financial services or privacy laws set by local, state or federal governments. This data is usually transmitted as a series of database tables (e.g., .sql format), text files (e.g., .csv, .txt, .xls, .doc, and .rtp format), or as a real-time data feed (e.g., XML or JSON). Despite this, it often occurs that the Data Owner's data leaks (the leaked file is defined herein as a "Leaked Subset") into the hands of others ("Bad Actors") who either knowingly or unknowingly use the data without proper permission or even illegally. This can happen because, for example, a TTP knowingly releases the data and is itself a Bad Actor; an employee of the TTP knowingly or accidentally releases the data; or an employee of the Data Owner itself knowingly or unknowingly leaks the data.

Watermarking of databases, text files or real-time data feeds (e.g., XML or JSON) presents unique challenges. Images, videos or audio files are dense and highly structured. It is easy to embed a small amount of data as a watermark in these files without degrading the file's information content or user experience because these types of files are "noise resistant". A noise resistant file is one in which a bit of noise (such as a watermark) can be added without degrading the overall content; for example, watermarks can be added to video files by altering a few bits of data or altering the order of adjacent frames without the viewer noticing the change. At the same time, the organizational format of this type of data makes it difficult for a Bad Actor to remove the watermark. Database, text files or real-time data feeds (e.g., XML or JSON), by comparison, lack variance in binary range, and thus are intolerant to the introduction of noise. For example, changing even a single character in a name or address may cause the data in that record to be useless. The structure of this type of data can easily be manipulated in ways (e.g., reordering columns, appending rows, deleting rows) that make a watermark fragile or easy to detect, and therefore easy to make unrecognizable to the party seeking to establish that the data has been improperly used. For example, elements within a data table can be altered; data can be merged with data from other data sources; and data can be divided into subsets and/or rearranged and manipulated in other ways to avoid detection. As a result, significant obstacles exist for a Data Owner who wants to assert ownership of a database or text file (or its JSON or XML equivalent) and/or detect the party responsible for leaking the data. Nor can a Data Owner easily recover lost revenue through action at law, because it lacks proof of the wrongful conduct that meets applicable evidentiary standards. Moreover, current methods for detecting data leaks are primarily through manual operations and are thus time-consuming, labor-intensive, expensive, and error-prone.

Data leakage protection is an established business covering data leakage across networks, from endpoints, and from data in motion. This often involves encrypting the data in some form so that it cannot be used without having the private key that was used to encrypt the data. The problem is that the data itself, to be useful, must be decrypted. And once decrypted, the data is open to theft and to numerous types of attack that can obfuscate both the original owner of the data and who stole it. This may be referred to as the unprotected "last mile" of data leakage. This occurs when database files are in the clear, when data feeds arrive at their endpoints and are decrypted, and when text files—like software code—can be acquired without protection. An improved system and method of detecting data leakage and identifying the guilty party responsible for leakage that occurs in this last mile would thus be of great benefit.

SUMMARY

In various embodiments of the present invention (referred to herein as the "System"), the invention allows the owners of data sources ("Data Owners") to identify and assert ownership of textual data that has been distributed outside of their firewall in the clear (i.e., without encryption), either intentionally or unintentionally. The System can be used by Data Owners who transmit, lease, or sell data to individuals or organizations ("Trusted Third Parties" or "TTPs") to recognize and assert ownership of their data in the case where one or more TTPs leaks the data (the leaked file is defined as a "Leaked Subset") into the hands of others ("Bad Actors") who either knowingly or unknowingly use the data illegally. The System can also be used where data leakage happens to the original Data Owner, as in the case where an employee collaborates with external Bad Actors.

The problem to which the present invention is addressed is made more complicated when legal remedies are considered. A Data Owner may suspect data found "in the wild" is theirs. (A file "in the wild" is one that is found outside of the Data Owner's firewall; such a file is referred to herein as a "wild file.") But in order to prove data ownership in court, there must be mechanics that prove ownership with a high confidence level that will hold up to evidentiary standards and scrutiny. Moreover, identifying the guilty party who leaked the data and preventing that party from doing so again is an even more challenging problem when data in the wild may already have transferred through many hands before its existence is discovered. Thus, there are two elements that must be taken into account to solve the last mile problem: a solution must (1) ensure that an individual or organization can assert ownership of database or text data with sufficient probability; and (2) identify with sufficient probability the individual or organization who illegally shared the data with other third parties.

The present invention is based on the notion of a guilt model. In this model, the Data Owner can be identified reliably using a variety of fingerprinting and/or watermarking techniques when the original data has been manipulated, often extensively, to obfuscate its original owner. This is especially difficult to do when there is a great degree of overlap between two files sent to two different agents. The invention solves this problem by providing a sufficient degree of certainty concerning ownership and identity of the Bad Actor.

The present invention comprises the "engine" of the data watermarking and fingerprinting system, which encompasses the core end-to-end functionalities from input processing to output. While other patent applications filed by the applicant address the specific mechanics used for watermark and fingerprint processing, the various embodiments of this invention are directed to all sub-systems and modules that together form the fundamental overarching engine.

These and other features, objects and advantages of the present invention will become better understood from a consideration of the following detailed description of the preferred embodiments and appended claims in conjunction with the drawings as described following:

DRAWINGS

FIG. 1 illustrates the overlap between two files and a "wild file" that contains some of the information from the files.

DESCRIPTION OF PREFERRED EMBODIMENT(S)

Figure 2:
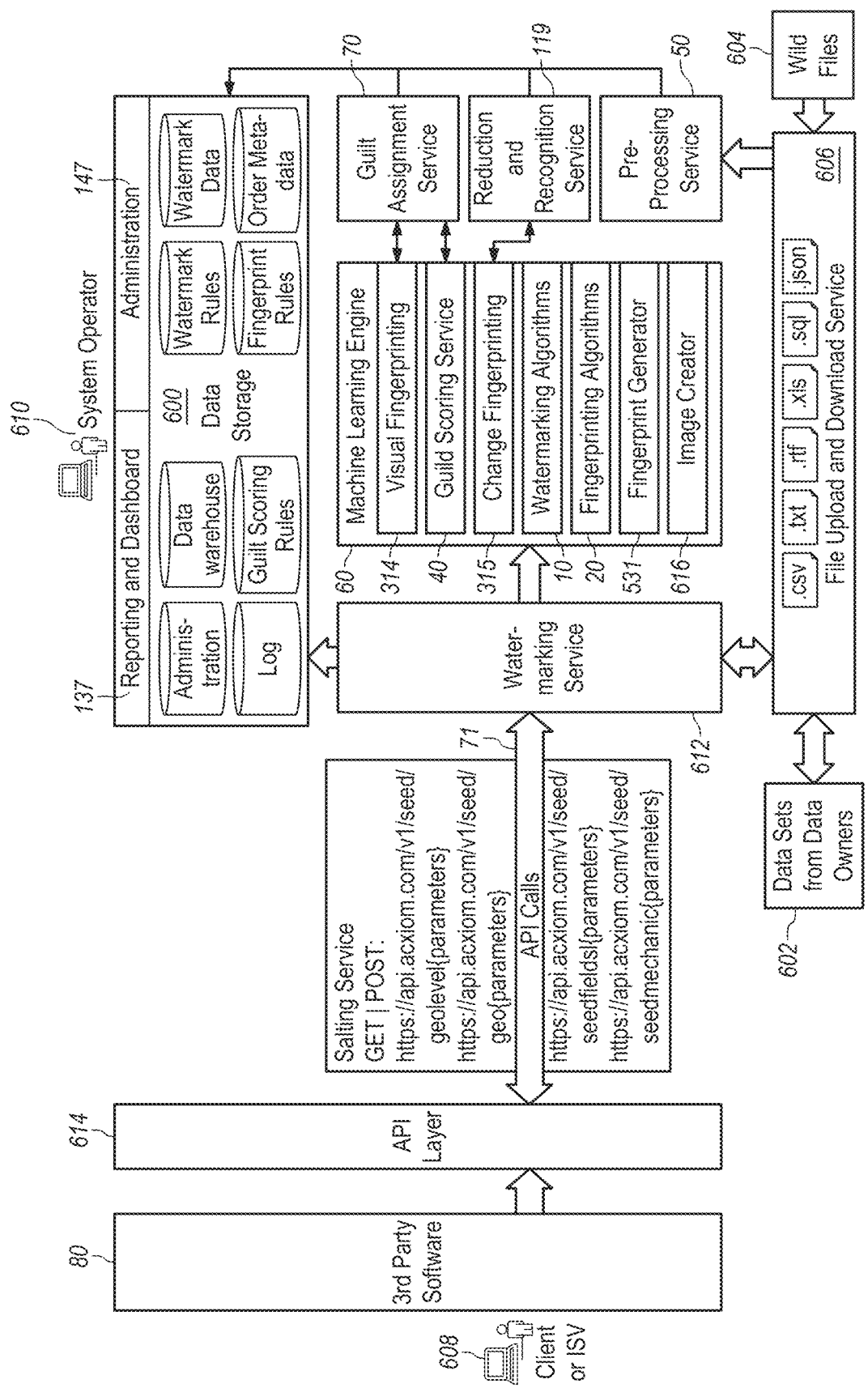
FIG. 2 is a schematic providing a logical structure view of an embodiment of the present invention.

Before the present invention is described in further detail, it should be understood that the invention is not limited to the particular embodiments and implementations described, and that the terms used in describing the particular embodiments and implementations are for the purpose of describing those particular embodiments and implementations only, and are not intended to be limiting, since the scope of the present invention will be limited only by the claims.

With reference to FIG. 1, the problem that certain embodiments of the present invention are designed to solve may be more fully set forth. Given two Agents $A_1$ and $A_2$ who have received different subsets of data, $S_1$ and $S_2$, from a data distributor, and given a wild file $W_i$ containing a mix of data, the problem is to determine who is the most likely to have leaked the data. That is to say, what is the posterior probability that $A_1$ is guilty ($G_1$) given that it received $S_1$—denoted as $Pr\{G_1|S_1\}$—as compared to the posterior probability that $A_2$ is guilty ($G_2$) given that it received $S_2$—denoted as $Pr\{G_2|S_2\}$.

Intuition leads one to believe that the less overlap there is between the two subsets, then the easier it is to determine the likely leaker. For example, if one finds data in the wild from an unlicensed third party that was given to only one agent, that agent must be the leaker. If, on the other hand, two files sent to two different agents contain exactly the same data, it is impossible to determine who the leaker is without some agent-unique fingerprinting technique overlaid on the data. In FIG. 1, it may be seen that subsets $S_1$ and $S_2$ have certain columns and rows in common. The wild file $W_1$ contains columns and rows common to both subsets. However, row 10 is only in $S_1$, so this will tend to make the probability higher that $A_1$ is the likely leaker. The question is—and what the guilt model of certain embodiments of the present invention has been developed to determine—by how much does that unique row increase that posterior probability?

To begin a discussion of certain implementations of the invention, the precise definition of the associated technical statement is presented as follows. Let D be a database, including but not limited to a flat file, owned by a Company ("the Data Owner") C. D consists of tuples in relational form or structured text (e.g., .csv, XML, or SQL data). Let $S_i$ be a subset of tuples from D. Let M be a unique method to generate F, a representation of D or $S_i$ that is much smaller than D. The goal then is to generate an F such that:

1. F is a unique fingerprint of D or $S_i$ for a given M (i.e., M cannot generate the same F for two different Ds or Si's).
2. F can be used to determine, with statistical confidence, that an Agent $A_1$ is distributing or altering D or $S_1$ versus other Agents $A_2, A_3, \ldots A_n$ who receive a copy of D or a different $S_i$ that partially overlaps $S_1$.

3. F would be sufficiently robust to meet evidentiary standards to prove that D', a second copy or subset of D, was created without the consent of C. This means that the probability of a false negative (we identify D' as being illegitimate when it is not) or a false positive (we identify D' as legitimate when it is not) must be small. It may be of particular importance in certain applications to minimize the probability of a false negative.
4. F is not readable or reproducible even if a Bad Actor knows M.
5. F must cause no loss of information from D or $S_i$ at the time they are generated for a specific $A_i$.
6. If M embeds F in D, recovery of F is blind. That is, F can be obtained from D' without knowledge of D if and only if D' and D, or exact duplicate S and S' taken from D and D' respectively, are equivalent.
7. The process by which F is created must be robust enough to deal with significant differences in tuples (e.g., extra blank spaces, data resorting, tuple deletion, tuple addition) between D and D' without generating a false negative.
8. M must take into account that a $D_i$ from C is updated on a regular basis, becoming $D_j$ and allow for the ability to distinguish $D_i$ from $D_j$.
9. M must be computationally feasible with readily available computing equipment.

M does not have to identify exactly what changes were made to D or $S_i$ when it becomes D' or $S_i'$, although detailed examination of D' or $S_i'$ can and should provide supporting evidence for W as an indicator of the Bad Actor status of $A_i$.

In certain embodiments of the invention as described herein, the System protects Data Owners by providing four sets of services. The first, the watermarking service, functions to subtly alter data within a data table or text file so that its legal owner or issuer can be validated when a file—or one created from it—is obtained from third parties (a "wild file", abbreviated as $w_i$). The watermarking service uses one or more watermarking algorithms residing on the System to embed watermarks in a file in a specific way that makes it possible to later recognize the file as belonging to the Data Owner and, if correctly implemented, identify the likely source of the leak. As an example, a client first provides a file or a data feed via API (application programming interface), SFTP (secure file transfer protocol), or any other transfer means to be watermarked, and the System receives the file, imprints a watermark on the data, and generates a watermarked output file to the client via API or SFTP.

The watermarking service calls the fingerprinting algorithms to create a fingerprint or unique "snapshot" of the data table or text file that resides "outside" the data source and does not alter it in any way. The service uses one or more algorithms 20 residing on the System to capture a fingerprint of a file in a specific way that makes it possible to later recognize the file as belonging to the Data Owner and if correctly implemented, identify the likely source of the leak. As an example, a client provides a file or a data feed via API or SFTP to be fingerprinted, and then the System receives the file, creates one or more statistical "pictures" (fingerprints) of the data, and the statistical image is stored. While not required technically, the original file can be stored along with the fingerprint for future use in court proceedings, if needed.

Watermarking and fingerprinting can be complimentary and synergistic. Each technique can be used in isolation, but it is believed that the optimal approach is to use both techniques in a multi-layered model. Different watermarking and fingerprinting algorithms are stronger against different types of attacks. Therefore, using a multi-layered approach may yield a potentially higher statistical certainty of guilt than using one technique on its own.

The System described in this invention was specifically designed for a multi-layered approach to fingerprinting and watermarking. To do this all subsystems in the end-to-end System must be constructed and optimized in balance with all the others in order to accomplish this goal in a production-grade system at scale. Single, stand-alone subsystems, if strung together independently, are almost certain to fail to produce statistically valid results in a timeframe required by customers of a commercial data protection service, because the way the algorithms work together to provide protection must be balanced on the back side by the watermark retrieval functionality to account for the way in which the algorithms are applied to individual data sets.

The third service, the recognition service, processes a $w_i$ and attempts to retrieve any embedded watermark or match the file to a specific fingerprint. It is important to remember that we do not know whether a given data table contains the Data Owner's data at the time the $w_i$ is acquired. The recognition service pre-processes the file into a form where the watermark can be retrieved if one has been embedded, or the fingerprint recreated. But even if the $w_i$ does contain the Data Owner's data, it may only contain a Leaked Subset, and so only a partial watermark or fingerprint. The recognition service preferably should be robust enough to identify the watermark or fingerprint a majority of the time even in these circumstances.

The fourth service, the guilt assignment service, generates a statistical probability that a specific TTP is, in fact, the Bad Actor that illegally distributed the data. Assigning guilt is potentially difficult when there are thousands of TTPs who receive data from a Data Owner. Watermarking and fingerprinting would ideally yield 100% certainty as to the identity of the leaker. If done correctly, watermarking or fingerprinting will rule out most TTPs, and leave only a few potential likely suspects, each of whom has a different statistical likelihood of being the source of the leak. The guilt assignment service is designed in such a way as to maximize the "statistical distance" between each party so that one TTP is significantly more likely to have been the source rather than the others.

The System consists of three basic subsystems, as shown in FIG. 2:
1. The Machine Learning Engine 60 Subsystem. This subsystem provides all algorithms and machine learning capabilities needed by the watermarking service 612, guilt assignment service 70 and reduction and recognition service 119.
2. The Watermarking Service 612 Subsystem. This subsystem provides access to the watermarking algorithms 10 and fingerprinting algorithms 20 in the machine learning engine 60. The output from this service is delivered to the user via the file upload and download service 606.
3. The Guilt Assignment Service 70 Subsystem. This subsystem provides recovery and guilt assignment services. Files submitted into guilt assignment service via the file upload and download service 606 are pre-processed at pre-processing service 50 into a standardized format, the watermark or fingerprint is retrieved (if it exists), and then guilt is assigned to the likely source of the leak.

Note that the file upload and download service 606 takes in files in numerous formats including, but not limited to, .csv, .txt, .rtf, .xls, .sql, XML and JSON.

The machine learning engine 60 is the core of the System. It houses statistical models and algorithms for processing service requests/functionality. It is architecturally decoupled from the rest of the system components and accessible by API calls as a service by an authorized internal and external system. The engine is built with the capability to learn using predictive machine learning techniques. The engine generalizes processing experiences to adapt, update, and refine the processing rules, statistical models and algorithms over time.

Referring now in more detail to the logical overview of the System according to a preferred embodiment as shown in FIG. 2, watermarking service 612 provides the functionality to imprint a watermark into a file submitted to the System. The System allows a user, through the user interface for example, to apply watermark technologies to the file. Simple embedded watermarks, such as salting fields where minor changes do not alter the information value of the tuple, or embedding complete, counterfeit seed tuples, are among the potential options. These methods may also include using changes in hidden characters (e.g., nulls) to create a watermark. Watermarking algorithms 10 and techniques include, but not limited to, salting, salting via sorting, image embedding, speech embedding, and genetic algorithms.

The watermarking service 612 applies any number of fingerprinting algorithms 20 to the input file. Examples include, but are not limited to, statistical association and mixed data fingerprinting with principal components analysis. In FIG. 2, the aforementioned fingerprinting mechanics, fingerprint generator 531, and image creator 616 sub-components are shown, although the invention is not limited to these particular examples of fingerprinting techniques.

Being able to handle multiple algorithms from a single service is critical to, and a unique feature of, the design of the system. Data fingerprinting is very much like other security systems that must defend against multiple attack vectors. Any single algorithm will perform well against one or a few types of attacks, but not all. Therefore, best practice involves using a layered approach of multiple algorithms to allow for defense against the entire range of attack vectors. For this invention, one algorithm will be better at detecting the fingerprint when new tuples are inserted, another will be better at detecting transformed fields in a single column, while a third may be better at detecting deletion of tuples from a table. All three are required to provide a strong statistical confidence of guilt against all possible manipulations of a data file by a Bad Actor.

Moreover, detecting Bad Actors is always a "cat and mouse" exercise. Today's technology may work for some amount of time, until the Bad Actor figures out a new attack vector that cannot be detected with current algorithms. Thus, by definition, the machine learning engine 60 in our system must allow for new algorithms (watermarking algorithms 10 and fingerprinting algorithms 20) to be added on a regular basis without disrupting the service or minimizing the efficacy of prior supported algorithms.

Visual fingerprinting via the visual fingerprint service 314 uses statistical patterns in fields to create a visual fingerprint that looks similar to a QR code. This fingerprint is based on different statistical measures that are appropriate for different scales of measurement: nominal, ordinal, interval, and ratio. Complex associative relationships among many variables in a file can be used to define a unique fingerprint, or serve as the basis for additional transformations.

Change fingerprinting 315 is a mechanic that allows the System to determine the creation month and year of any file or data feed where each row contains data on a single object and at least one column contains a "valid" age for each object, in order to determine the month and year in which the file was generated. A valid age is one that can be verified against a date of birth or production date although the invention also covers the case where a date of birth or production date "anchor" may not be available but one or more secondary sources containing ages can be used as an alternate mechanism to triangulate valid ages.

Figure 3:
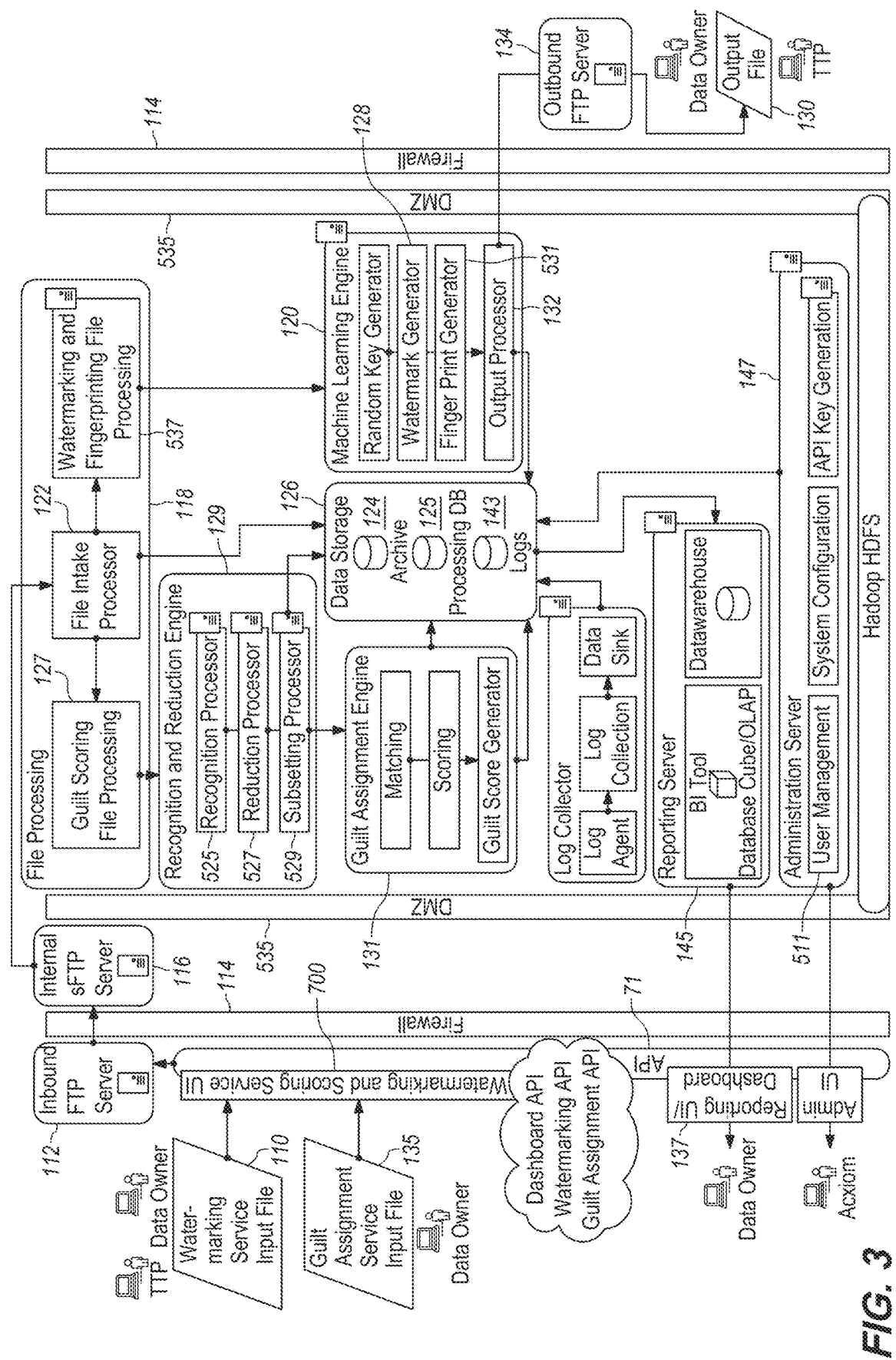
FIG. 3 is a schematic providing a physical structure view of an embodiment of the present invention.

Referring now to FIG. 3, the following is an example of user interaction with the System by a Data Owner to request watermarking and/or fingerprinting. First, the Data Owner logs in to the System via a user interface 700 and is authenticated, as with a password or some form of multi-factor authentication. The System receives the secure login request via API calls from the user interface and performs authentication of the user. Next, the user makes a request for watermarking and/or fingerprinting. The value retrieved from the menu is fed to an API call to be made to the machine learning engine 60. The user uploads the input file to be processed (watermarking service input file 110), either via API call or SFTP or some other transfer means, along with the file taxonomy (either separately or as a header row in the file). At the same time, the user identifies through fields in the user interface the input file format, the output format required, and the location where the output file should be sent. The System receives data via API call, or the System copies input files from the inbound FTP server 112 outside of firewall 114, and then passes it to the internal SFTP server 116 within the firewall and through DMZ 535. The System then internally generates an order for this request, and associates the input files with the order, at file processing server 118 using file intake processor subsystem 122. The System stores the input files in the archive database 124 in the data storage area 126. If the Data Owner has requested watermarking, watermark generator 128 of machine learning engine for watermarking and fingerprinting 120 (corresponding to watermarking and fingerprinting processing 537 of FIG. 3) calls data from the input file and imprints the watermark into the file. Then the fingerprint generator 531 of the machine learning engine for watermarking and fingerprinting 120 calls data from the input file, and creates a fingerprint of the watermarked file and stores it in data storage 124 for future reference. Once complete, the System outputs a watermarked file as output file 130 in this case, from output processor 132 and passing through outbound FTP server 134, which lies outside of firewall 114. The file may be output either via API or SFTP to a location as specified by the user.

The guilt scoring service 40 (FIG. 2) identifies the likely Bad Actor or Actors that illegally distributed the Data Owner's data and assigns a likelihood of guilt to each potential Bad Actor. The guilt scoring service takes wild files ($w_i$s) or data feeds that are suspected of containing leaked data as inputs and outputs a ranked list of likely Bad Actors along with the guilt score. The high-level processing steps are as follows:

1. Analyze the input file $w_i$ and prepare a statistical "picture" of the table at pre-processing system 50.
2. The machine learning engine 60 applies change fingerprinting mechanics 315 to reduce the target universe of possible data sources against which to compare $w_i$. This reduces the required processing time, as well as limiting the likely time frame for finding evidence during the discovery phase of a legal proceeding.

3. The engine then applies watermark and fingerprint retrieval models for the algorithms used in the watermarking mechanics 10 and fingerprinting mechanics 20 to attempt to retrieve any portion or all of the fingerprints or watermarks from the wild file. These results are stored for analysis by the guilt assignment service 70.

4. The guilt assignment processor 70 examines all the statistical patterns generated by watermark and fingerprint retrieval and then uses statistical methods such as but not limited to k-nearest neighbor or k-means clustering, to assign a "Guilt Score" to the input wild file. The resulting Guilt Score will indicate: the likelihood that the $w_i$ contains leaked records from a specific Data Owner's source system; the TTP that leaked the file; and the file(s) from the particular order(s) from which the leaked data originates.

Users access client-facing services, watermarking service 612 and guilt assignment service 70 via a graphical user interface (GUI) or server-to-server API calls. Watermarking service 612 interfaces the machine-learning engine of the preferred embodiments with internal and external user requests via API calls. Watermarking service 612 and guilt assignment service 70 pass the API requests to the machine-learning engine to process. The watermarking service output is delivered to the user via the user's preferred delivery method as part of file upload and download service 606.

Users interact with the System via a GUI, which allows the user to, for example, request and submit input data for watermarking and fingerprinting through processes 612, 10, and 20, respectively; request and submit input data for guilt assignment through process 70; monitor the status of submitted requests; and view various reporting dashboards 137.

The API layer (shown as 71 in FIG. 3, and shown generally as 614 in FIG. 2) provides the client-side functionality using API calls between users and the System through 3$^{rd}$ Party Software 80 to clients 608. Both internal users and third parties access a standard API service platform for request and fulfillment. Examples of REST API endpoints available via the service (for illustrative purposes only) include:

https://api.acxiom.com/v1/watermarking/salting/ . . .
https://api.acxiom.com/v1/watermarking/dct/ . . .
https://api.acxiom.com/v1/watermarking/dwt/ . . .
https://api.acxiom.com/v1/fingerprinting/randombit/ . . .
https://api.acxiom.com/v1/guiltscore/ . . .

The system provides a set of User Interface (UI) classes 30 (FIG. 2) that allow clients to create interfaces into the System from their software 80 via the API layer 614 so that their end users can request the System services.

Stepping through the detail of guilt assignment service from end-to-end, first the user uploads wild files 604 via file upload and download service 606 to determine their ownership (if possible), and then the System provides estimates of guilt for the TTPs most likely to have leaked the data. The key modules of guilt assignment service 70 are:

1. Pre-processing 50
2. Reduction and Recognition Engine 119
3. Guilt Scoring Service 40

Pre-processing 50 takes wis that are acquired with a variety of formats and standardizes them through various transformations to prepare them for later steps. Reduction and recognition 119 has two key functions. First, the prepared files are put through a series of steps to reduce the comparison universe of potentially matching files to the "evaluation set"—a manageable number. Then the System attempts to extract the watermark or fingerprint from the $w_i$ and match it to a file or files in the Evaluation Set.

Guilt assignment assigns guilt through the guilt assignment service (70 in FIG. 2 and more specifically 131 FIG. 3). The input file in this case is guilt assignment service input file 135 (FIG. 3), but intake otherwise proceeds as with watermarking/fingerprinting.

The system according to the implementations described herein has the capacity of watermarking, fingerprinting as well as assigning guilt to data files, database tables, and data feeds of unlimited size. Processing speed, however, is also important, since customers cannot wait days or weeks to return watermarked files or for guilt assignment to occur. The system must be capable of watermarking, fingerprinting and/or assigning guilt to a file within the cycle time of production of the next file, or else the system will bottleneck and files will fall into an ever-growing queue which will cause the entire business model to break down. Thus, the throughput in the Marginal Viable Product (MVP) release of the system according to one embodiment is 380 GB file size in 24 hours for watermarking service, and 380 GB file size in 120 hours for guilt assignment service. The specific method which enables fast processing includes reading and processing the input file without loading data into the database. Utilizing this method, the system has achieved performance improvement of 600% compared to the previous method of reading and writing the input data file to the storage area and subsequently the database prior to processing, that is, watermarking, fingerprinting and guilt assignment. The specific method that enables fast processing excludes the database overhead of storing and processing the file in a SQL or noSQL database and removes what are effectively extra steps of reading and writing data into and out of database storage. Moreover, reading and writing into a database is a significantly slower process because it is limited by the bandwidth of disk I/O, as compared to in-memory processing of the data, which has no such limitations. The fast processing solution does include reading and processing the input file before loading into the database. The result has been a 600% reduction in processing time for watermarking, fingerprint and guilt assignment. Computing power and CPUs required are largely reduced because it is not necessary to read and write a 380 GB file into the database server. Memory usage is optimized as unnecessary I/O is minimized. Further saving time and costs, human interaction and examination is not required using this system.

Figure 4A:
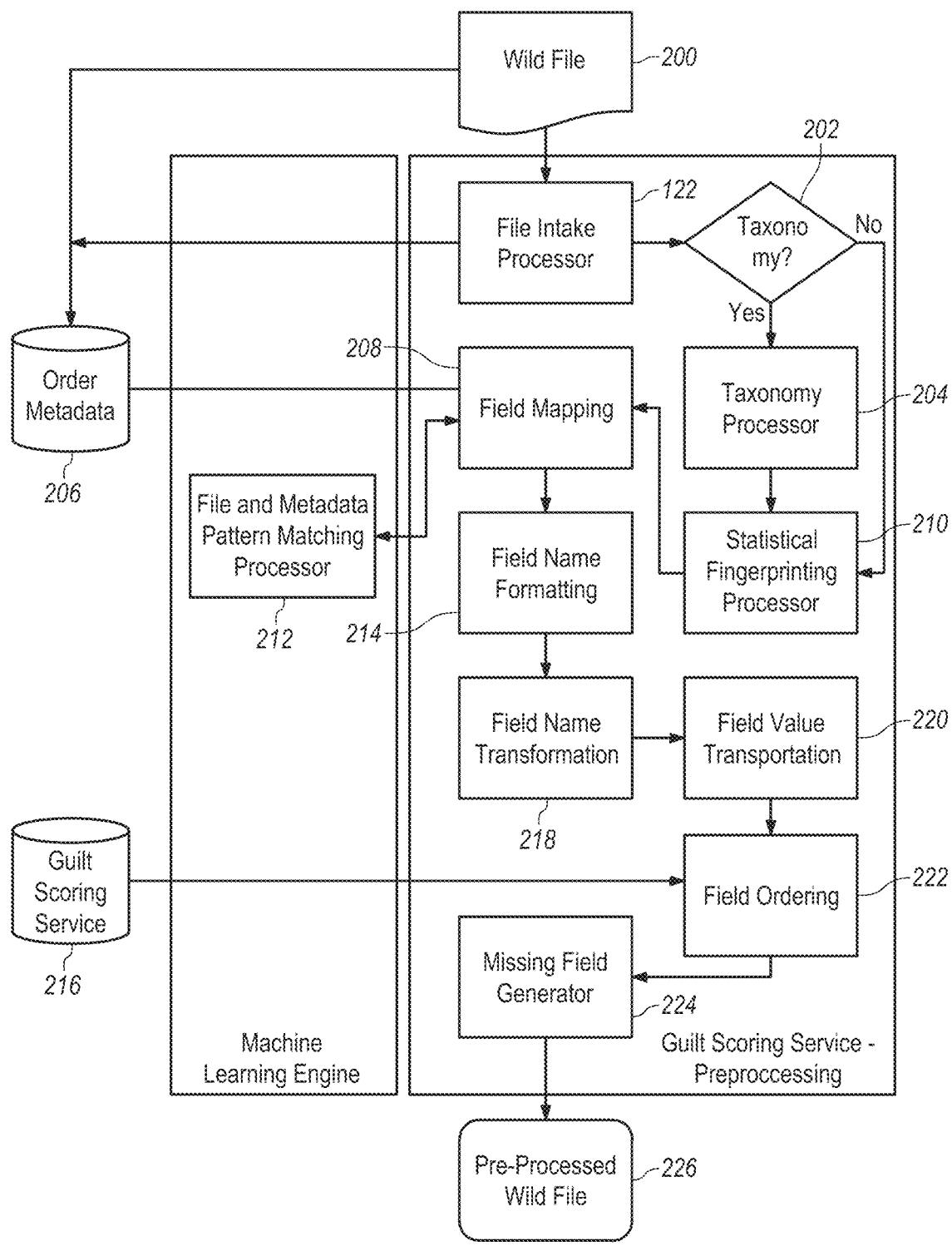
FIG. 4A is a flow chart providing process flow for a pre-processing subsystem according to an embodiment of the present invention.

The file loader processor (described as pre-processing service 50 in FIG. 2) checks for completeness of file transmission and verifies that the data is not corrupted. It also performs multiple statistical analyses of the incoming file, capturing metadata used in later stages of reduction, recognition, and guilt assignment. FIG. 4A illustrates the process flow of the file loader. The process begins at file intake processor 122 by identifying whether a taxonomy exists for the wild file ($w_i$) 200 at taxonomy decision block 202. If the taxonomy of the $w_i$ 200 exists, the taxonomy processor 204 reads and extracts the taxonomy information. Taxonomy information may include, but is not limited to, field name, existing/allowed field values, field value description, and data type. The taxonomy data is stored in the order metadata database 206 that resides in the System's data storage, which corresponds to processing database 125 in FIG. 3.

The statistical fingerprinting processor 210 performs multiple statistical analyses on the incoming file, capturing a series of metadata, including but not limited to file size, number of rows, moments of the statistical distributions for each column, and measures of association between fields appropriate to their scale of measurement. This metadata becomes part of a larger statistical fingerprint that is created for the $w_i$ 200 and is used later in reduction, recognition, and guilt assignment. The statistical metadata is stored in the order metadata database 206 that resides in the System's data storage, represented as the processing database 125 in FIG. 3.

The field mapping processor 208 maps each field to a field category to classify the type of data, based on the taxonomy of the $w_i$ 200. Examples of field categories are first name, last name and gender.

Figure 4B:
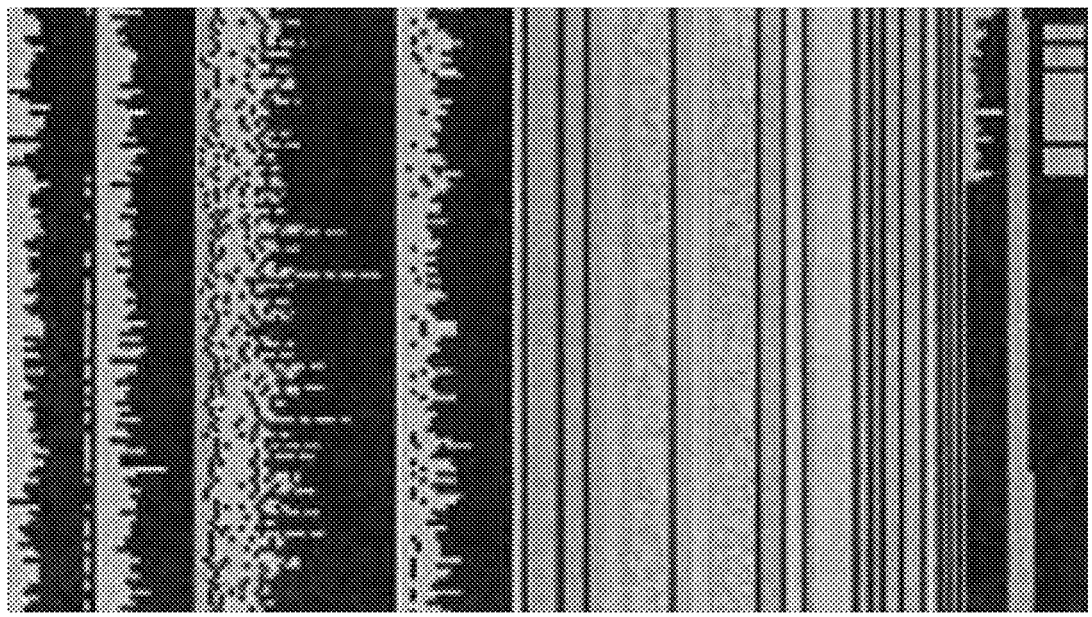
FIG. 4B is a graphical representation of data in an example text file according to an embodiment of the present invention.

If the taxonomy is missing, the System maps the fields in the $w_i$ 200 using statistical methods at statistical fingerprinting processor 210. Statistically, every field has a unique pattern; an example of this pattern is provided in FIG. 4B, where black areas represent empty (null) spaces, lighter gray represents numbers, and letters. The System uses this characteristic to systematically match a field to a category as part of reduction and recognition service 119. In this way, for example, address fields can be identified (because they usually begin with numbers and end with letters), name fields can be recognized (they contain only letters), ZIP code fields can be recognized (they represent a set number of numbers), and so on.

The field mapping process calls the file and metadata pattern matching processor 212. It first retrieves the statistical profile of $w_i$ 200 from the order metadata 206, then matches the profile against the field category profile for the closest match. The $w_i$ field is mapped to the corresponding category when a match is found. As a result, all the fields in the $w_i$ will be mapped to a field category.

After each field has been mapped, the system formats the field name to the standard naming convention at field name formatting process 214 so that each field can be read, comprehended, and processed systematically in the subsequent steps at field value transformation process 218. For example, a first name field may be mapped to the pre-defined field name "FNAME". The System next transforms each of the personally identifiable information (PII) field values to a standard list of values at field value transposition process 220. As an example, the input file may represent gender as "Male", "Female" and "Unknown". The value will then be transformed from "Male" to "1", "Female" to "2" and "Unknown" to "0", assuming "1", "2" and "0" are the standard values. Transformation values are stored in the guilt scoring rules database 216 that resides in the System's data storage, represented as processing database 125 in FIG. 3.

In order for field values to be processed systematically, data that is stored in horizontal or vertical table structures is transposed at field value transformation process 218 to the standardized format.

As an example, the original input file may be laid out as in Table 1 below.

TABLE 1

| ID | First Name | Last Name | Age 18-35 | Age 36-45 | Age 46-55 | Age 56-65 | Age 65+ |
|---|---|---|---|---|---|---|---|
| 100001 | Amy | Lambert | 1 | 0 | 0 | 0 | 0 |
| 100002 | Mike | Shane | 0 | 1 | 0 | 0 | 0 |
| 100003 | Rebecca | Lee | 0 | 0 | 0 | 1 | 0 |

The data is then transformed to the layout shown below in Table 2.

TABLE 2

| ID | First Name | Last Name | Age Range |
|---|---|---|---|
| 100001 | Amy | Lambert | A |
| 100002 | Mike | Shane | B |
| 100003 | Rebecca | Lee | D |

Where A = 18-35, B = 36-45, C = 46-55, D = 56-65, and E = Over 65, assuming these are the appropriate standardized values.

In certain embodiments, field ordering at field ordering process 222 rearranges the fields in the $w_i$ 200 based on a set of standard rules. Rearranging the fields and rows of the $w_i$ 200 using a pre-defined order allows the System to generate an approximate representation of the original file with which to compare.

Assume a $w_i$ 200 has these fields: first name, last name, address, city, state, zip, age and income. In order to most closely statistically match against the potential original file, one needs to insert the gender field after last name and the home-owner flag after income. This type of processing takes place at missing field generator 224. The system can leverage comprehensive commercial databases with consumer information, such as Acxiom Corporation's InfoBase product, to append the corresponding gender and home-owner flag based on the $w_i$'s PII information. The result is pre-processed wild file 226.

Figure 5A:
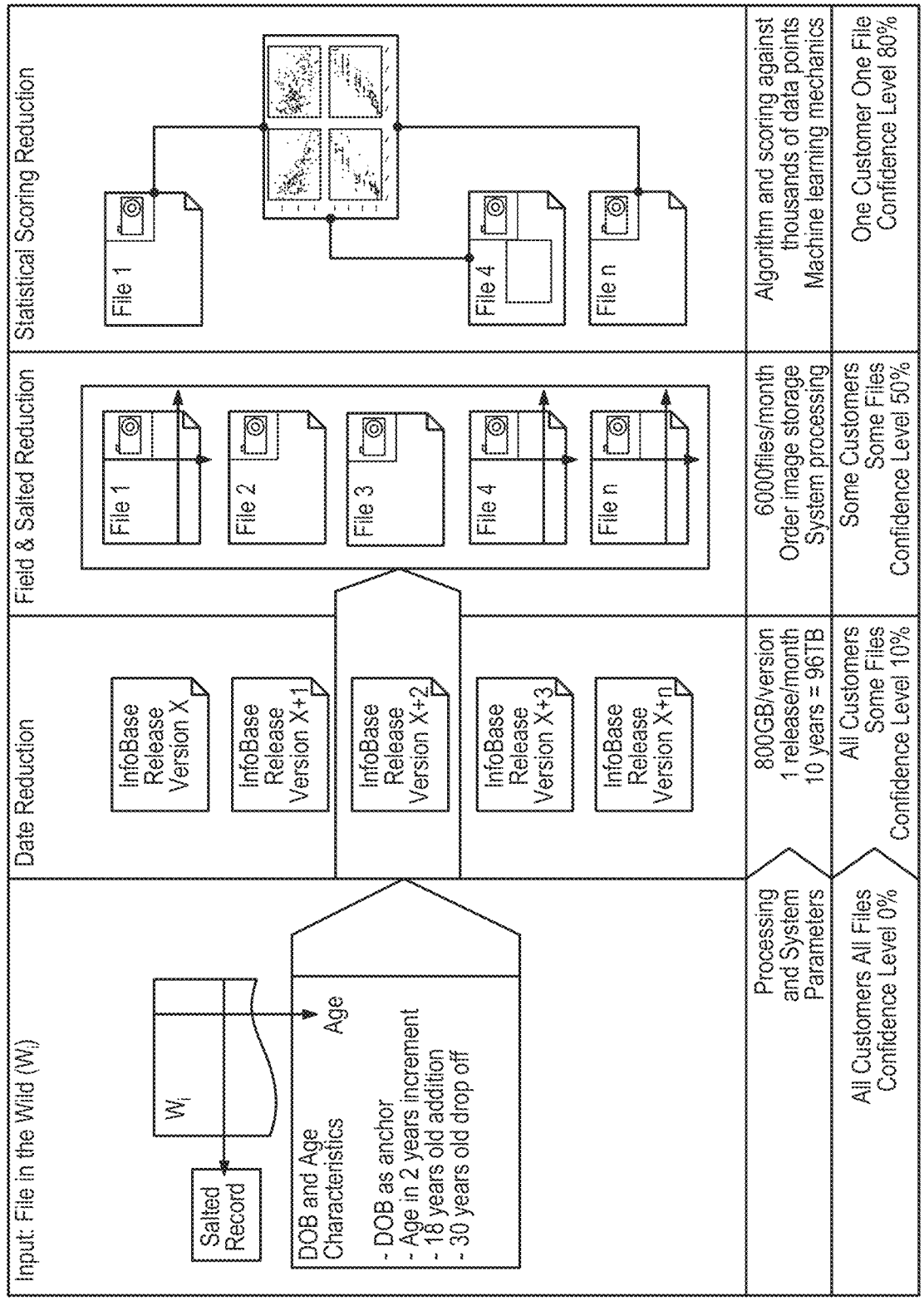
FIG. 5A is a data flow diagram illustrating efficiencies achieved in the overall system for processing wild files according to an embodiment of the present invention.

Reduction and recognition takes the files output 266 from pre-processing as shown in FIG. 4A and applies multiple steps to reduce the size of the comparison file and TTP universes (the "Evaluation Set") over which guilt scoring, an extremely processor- and bandwidth-intensive process, must be applied. The general flow of reduction and recognition is shown in FIG. 5A.

The reasoning behind the recognition and reduction module is illustrated by the following example and assumptions. Suppose that a Data Owner acquires a data file (a $w_i$) from a potential Bad Actor that appears to contain the Data Owner's proprietary information. Appearance, however, is not good enough to prove the Bad Actor guilty in court. The Data Owner thus needs to prove within reason that some or all of the data in $w_i$ actually came from the Data Owner. The Data Owner, in this example, issues 200,000 files a year, either as database tables, text files, or electronic XML or JSON data feeds. These contain some subset $S_j$ of the Data Owner's data. The data in two different $S_j$'s issued at a time t, denoted as $S_{j,t}$ measured as a month and year, may be the same, overlapping, or completely different. More importantly, when a specific $S_j$ is reissued at some later time t+1 ($S_{j,t+1}$), some of the values for specific rows of data may have changed. The Data Owner keeps a copy of every file it generates for ten years, or two million files in its historic order database. Theoretically, the Data Owner should be able to compare $w_i$ with all two million $S_{j,t}$'s and based on the data identify which $S_j$ and TTP was the source of the In reality, comparing large files with two million other large files involves a great deal of processing overhead. Moreover, as the System is intended as a product offering for multiple Data Owners, the system would be processing multiple $w_i$s in parallel against some large number of $S_{j,t}$'s that now include files other than the Data Owner's two million. A single Data Owner in the data broker industry could potentially have as many or more than the two million files that the exemplar Data Owner generates in ten years. The System needs to be built to solve a scale problem of immense proportions. As such, reduction and recognition is specifically designed to reduce a search space of two million files to one of about 17,000 files. The process flow of reduction and recognition is illustrated in FIG. 5A. The process is a waterfall that flows from least processing intensive to most processing intensive methods. The process stops at whatever step in the waterfall is needed to achieve a definitive match between the wi and a file from the Evaluation Set.

Figure 5B:
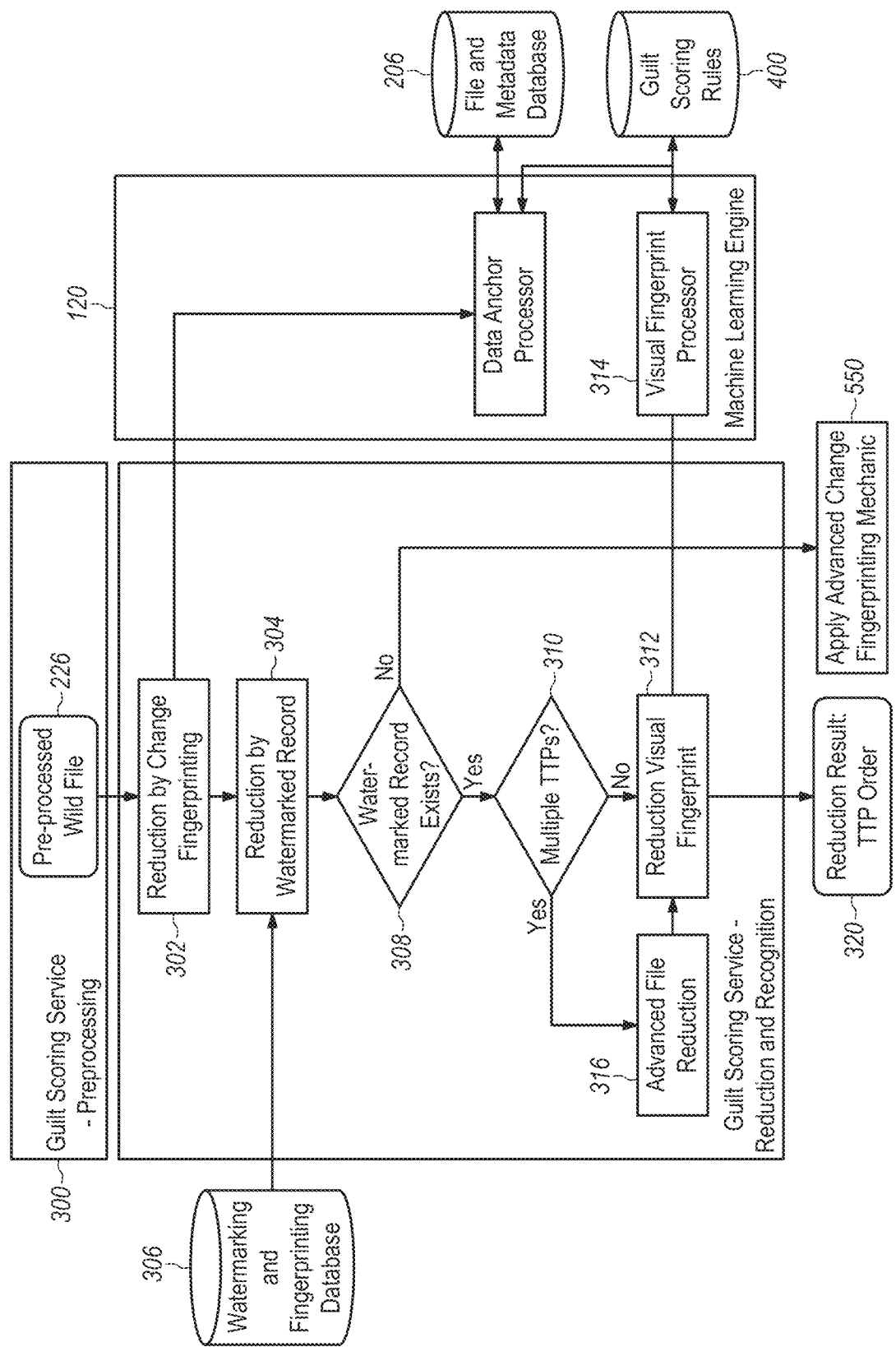
FIG. 5B is a flow chart providing process flow for a reduction and recognition portion of a guilt scoring subsystem according to an embodiment of the present invention.

The process shown in FIG. 5B begins with guilt scoring services—preprocessing process 300. The first reduction process is reduction by change fingerprinting process 302. This process leverages the presence of a primary "valid" age for each record in the file or alternatively secondary sources that contain ages to triangulate the month and year that the input file was created. The system appends the date of birth of each individual by using a recognition service, such as Acxiom Corporation's AbiliTec technology. This is the function provided by the recognition processor 129 of FIG. 3. The result of this process is a reduced Evaluation Set for comparison with the $w_i$ in the next step. Change fingerprinting 315 (see FIG. 2) should typically reduce the evaluation set by over 90%, since it eliminates 11 months of data from the consideration set.

At reduction by watermarked record process 304, the System checks the pre-processed wild file 226 for the presence of salted records by applying the following steps (performed in guilt assignment engine 131 of FIG. 3):
1. Randomly select 5%, for example, of the records in the pre-processed wild file 226;
2. Search for files in the Evaluation Set that were salted using watermarking and fingerprinting database 306;
3. Check if a match is found at watermarked record exists decision block 308, and if not move to apply advanced change fingerprinting mechanic block 550; and
4. Repeat the steps with the next 5%, for example, of records until the file is fully scanned.

This is a core mechanic, but as mentioned throughout this document, the System is designed to allow for either the addition of or changes to algorithms in any part of the System via the machine-learning layer.

Identifying salted records in the pre-processed wild file 226 reduces the Evaluation Set substantially. It does not, however, necessarily reduce it to a single file. Since the $w_i$ could potentially contain salted records from multiple files given to one or more TTPs, the match may not be definitive. This is the reason for multiple TTPs decision block 310. However, in many cases the match will be definitive and the process can stop.

In the next step, a reduction visual fingerprint process 312, the System in certain embodiments receives (or has access to) all data files created and shipped from all of the Data Owner's order entry systems on a periodic basis. The System generates a statistical image of the order and stores that visual fingerprint in the system's database at the time of the order. An image processor at visual fingerprint processor 314 then performs the following steps:
1. retrieve visual fingerprints of the orders within the Evaluation Set in the database;
2. using similarity analysis, match as closely as possible one or more visual fingerprints from files in the Evaluation Set with the pre-processed wild file 226; and
3. because it is unlikely that the image from the pre-processed wild file 226 will match any existing image 100% due to any number factors (just as in CODIS, the US database of criminal fingerprints), there will be some statistical probability of match based on the number of elements within both images that do match; the comparison of visual fingerprints thus generates a score that represents the similarity of the images based on the business rules defined in the guilt scoring rules database.

When multiple TTPs are identified at multiple TTPs decision block 310, the system applies advanced file reduction rules at advanced file reduction process 316 that include, but are not limited to, the following steps:
1. if it is determined that a wild file could most likely only have come from one source, and if the file contains a field that a TTP never received (e.g., Luxury car buying propensity), that TTP and all the files of the TTP are excluded;
2. if it is determined that a wild file could most likely only have come from one source and if the file contains a data segment that a TTP never received (e.g., a TTP who never received "lives in New York and age 35-55" because the TPP only receives the data segment for "lives on the West Coast and age over 55"), then the TTP and all the files of the TTP can be excluded; and
3. if it is determined that a wild file could most likely only have come from one source and if a column in the wild file was only ordered by a few TTPs then all other TTPs can be excluded.

The result of this process is a reduced file universe for pre-processed wild file 226 to compare with possible files. The output is the TTP and order values 320 that are fed to guilt assignment.

Figure 6:
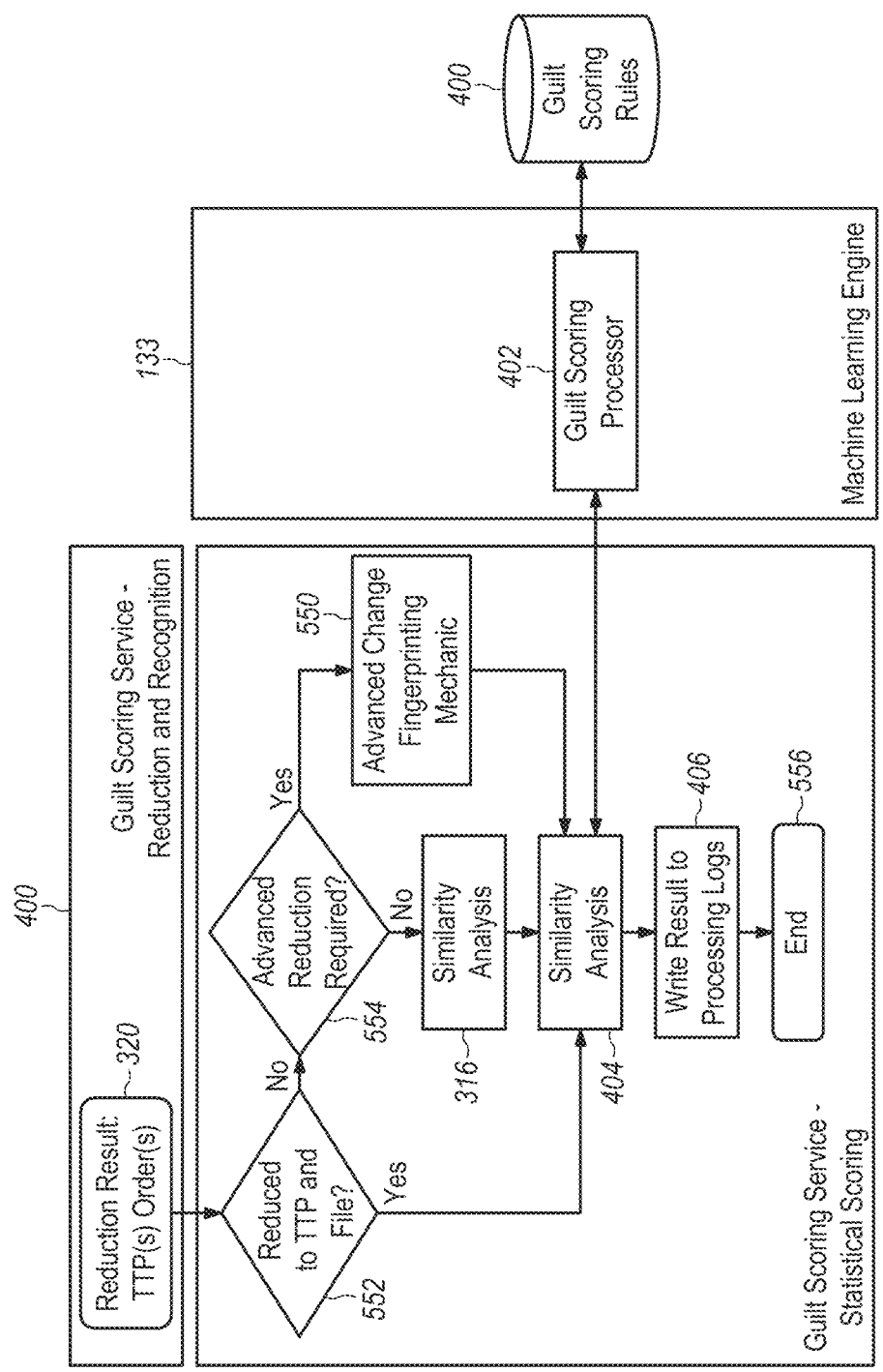
FIG. 6 is a flow chart providing process flow for a statistical scoring portion of a guilt scoring subsystem according to an embodiment of the present invention.

The guilt assignment process shown in the flow chart of FIG. 6 (and corresponding to guilt scoring service 40 in FIG. 2 and guilt assignment 70 of FIG. 2 and guilt assignment engine 131 of FIG. 3) uses the output from reduction and recognition to compute the likelihood of guilt (a guilt score) of the TTPs who were identified in the prior processes as possible Bad Actors. The information provides sufficient detail to legally address the misuse of the data. Outputs from guilt assignment 70 may include date source identification, file date identification, TTP identification, and job/file identification.

The inputs to this module are results from reduction and recognition in TTP and order values 320: a reduced set of TTP(s); a reduced set of order(s); and a set of probabilities representing the likelihood of a match between a $w_i$ and historical orders.

Guilt scoring rules database 400 is the repository where guilt scoring business rules are defined and stored. Rules are defined based on data analysis research and statistical modeling. The system allows scoring rules to be configured and consumed by the guilt scoring rules engine 133.

The guilt scoring processor 402 (corresponding to guilt assignment engine 131 of FIG. 3) assigns a guilt score at process 404 to the TTPs that have been identified as contributing to the $w_i$ by submitting the remaining files and likely TTP contributors to the guilt scoring service contained in the machine learning subsystem. The guilt score for each TTP is based on a combination of business rules contained in the guilt scoring rules database and statistical models. Statistical models are required when simple rules do not suffice to assign a guilt score. Examples of simple rules are (1) the $w_i$ will yield a guilt score of 1 if the process matches the $w_i$ to one order from one TTP (a "yes" result at decision block 552, with a "no" resulting in a move to advanced reduction required decision block 554); or (2) where the $w_i$ could only have come from two TTPs, the $w_i$ will yield a guilt score of 0 for $TTP_1$ if no fields and no salted records from any file issued to $TTP_1$ are found.

Statistical models for guilt scoring include models of two types applied sequentially:
1. clustering algorithms (e.g. k-means) where guilt assignments are made based on the statistical similarities between groups (so "likely guilty" and likely "not guilty"); in a sense, this is another form of reduction mechanic; and
2. k-nearest neighbor, which then measures the statistical distance between the center of an "ideal" guilt space and the location of the specific TTPs within the "likely guilty" subset; the further from the centroid a TTP's result sits, the less likely they are to have been the Bad Actor.

The output of this process (at the end step 556) is: the leaked order (i.e., the file(s) from the particular order(s) from which the leaked data originated); the list of potentially guilty TTPs (a ranked ordering of TTPs that potentially leaked the file based on the guilt score); and the guilt score (indicating the likelihood that the file contains leaked records from a specific Data Owner's source system). This guilt scoring processor 402 writes the output of the guilt assignment process at process 406 to the appropriate tables (logs 143 of FIG. 3) in the metadata database.

Reporting and Dashboard services 137 (see FIG. 3) provide reporting functions to both Data Owner administrators and end-user clients. The reporting services take transaction logs, as well as data from various databases associated with inbound and outbound services and aggregate them into data cubes 145. From there business intelligence (BI) tools provide standard and ad hoc reporting functionality from the database.

The following are some standard reports types the system generates.

File processing statistics: covers file processing status, processing result and number of files being processed for a given time period. This includes processing both input wis and output files.

Match processing statistics: covers wi processing statistics. A user checks guilt assignments of the wi, as an example.

Watermarking and fingerprinting statistics: covers details of the watermarking and fingerprinting processes, including number of rows or columns effected, specific changes made, and robustness of mark or fingerprint, among other items.

The Administration subsystem 147 provides backend configuration and management functionalities to Data Owner administrative users.

User Management encompasses user account and group creation and deletion, access rights setup, configuration and management. A UI provides system administrators the ability to manage user credentials, authentication keys and account information.

Database Management allows administrators to configure database functionality for the system.

Audit Trail and Logs Management captures user login, actions, request and processing activities across all the components of the system at transaction level.

System Configuration Management enables administrators to setup and configure system settings; setup and configure file processing rules; setup and configure watermarking processing rules; setup and configure fingerprinting processing rules; and define and configure system variables.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. When a grouping is used herein, all individual members of the group and all combinations and subcombinations possible of the group are intended to be individually included. When a range is stated herein, the range is intended to include all subranges and individual points within the range. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention, as set forth in the appended claims.

The invention claimed is:

1. A method for assigning guilt related to a wild file, the method comprising the steps of:
    reading the wild file from an input data file or feed from an external source into a computing system memory and extracting a data set and a metadata set from the wild file;
    while the data set still resides in the computing system memory, applying recognition to the wild file to recover any watermark in the data set and to match the wild file with one of a plurality of fingerprints for data sets from previously processed data sets in order to identify the data set from which data in the wild file originated, wherein each of the plurality of fingerprints for data sets comprises the metadata set and wherein each of the plurality of fingerprints are visual fingerprints comprising statistical patterns in fields forming a statistical image, wherein the watermark in the data set is not detectable by a third party after the watermark is applied, and wherein the fingerprint comprises a subset of data smaller than the data set but that is sufficient to identify the data set and wherein the fingerprint comprises a visual fingerprint comprising statistical patterns in fields forming a statistical image; and
    assigning a guilt score for each potential recipient third party of the wild file; wherein the guilt score comprises an indication of a statistical probability that a particular third party was the source of the wild file.

2. The method of claim 1, wherein the step of assigning a guilt score comprises the steps of:
    constructing a statistical picture of the wild file;
    applying mechanics to the statistical picture of the wild file to reduce the target universe of possible data sets to an evaluation set; and
    comparing each data set in the evaluation set against the wild file.

3. The method of claim 2, wherein the step of assigning a guilt score further comprises the step of applying a statistical model to assign a guilt score to each potential recipient third party for the wild file.

4. The method of claim 3, wherein the statistical model is one or more of statistical models comprising k-nearest neighbor and k-means clustering.

5. The method of claim 3, wherein the guilt score comprises a likelihood that the wild file contains leaked data from a particular data owner's source system and the one or more data sets from that particular data owner's source system from which the wild file originates.

6. The method of claim 2, wherein the step of applying mechanics to the statistical picture of the wild file to reduce the target universe of possible data sets to an evaluation set comprises the step of applying change fingerprinting to reduce the number of possible data sets in the evaluation set to just those data sets with a corresponding time frame.

7. The method of claim 6, wherein the step of applying mechanics to the statistical picture of the wild file to reduce the target universe of possible data sets to an evaluation set further comprises the step of checking the wild file for the presence of records containing a watermark.

8. The method of claim 7, wherein the step of checking the wild file for the presence of records containing a watermark comprises the steps of:
   randomly selecting a subset of records in the wild file;
   comparing the randomly selected subset of records in the wild file to a database of previously used watermarks for a match with a previously used watermark; and
   repeating the steps of randomly selecting a subset of records in the wild file and comparing the randomly selected subset of records in the wild file to a database of previously used watermarks until either all records are scanned or a watermark match is found.

9. The method of claim 8, wherein if a watermark is found in a record in the wild file, further comprising the step of reducing the evaluation set to eliminate all data sets in the evaluation set that do not contain the watermark found in the wild file.

10. The method of claim 9, further comprising the steps of:
   creating a fingerprint for the wild file;
   comparing the wild file fingerprint with fingerprints of the data sets in the evaluation set using similarity analysis; and
   generating a score that represents the similarity between the wild file fingerprint and the fingerprint of each data set in the evaluation set.

11. The method of claim 2, further comprising the step of, if a particular third party never received a field, data segment, or column contained in the wild file, eliminating all data sets from the evaluation set that were sent only to such third-party recipient.

12. The method of claim 2, further comprising the step of, if a particular third party never received a field contained in the wild file, eliminating all data sets from the evaluation set that were sent only to such third-party recipient.

13. The method of claim 3, wherein the step of applying a statistical model to assign a guilt score to a third party for the wild file comprises the step of assigning the third party a guilt score of 1 on a scale of 0 to 1 if the statistical model matches the wild file to only that one third party recipient.

14. The method of claim 3, wherein the step of applying a statistical model to assign a guilt score to a third party for the wild file comprises the step of assigning the third party a guilt score of 0 on a scale of 0 to 1 if the statistical model does not match the wild file to a single third party and if the wild file contains no fields and no watermarked records issued to such third party.

15. A system for the watermarking and fingerprinting of a data set and assignment of guilt related to a wild file, comprising:
   a data set preprocessing routine resident on a computing system comprising a computing system memory, the data set preprocessing routine configured to read a data set from an external source into the computing system memory and to extract a metadata set from the data set;
   a watermark routine resident on the computing system and configured to apply a watermark to the data set while the data set still resides in computing system memory, wherein the watermark in the data set is not detectable by a third party after the watermark is applied;
   a fingerprint routine resident on the computing system and configured to create and store a fingerprint of the data set while the data set still resides in the computing system memory, wherein the fingerprint comprises a subset of data smaller than the data set but that is sufficient to identify the data set and wherein the fingerprint comprises a visual fingerprint comprising statistical patterns in fields forming a statistical image;
   a recognition routine comprising an image processor and configured to recover one or more watermarks in the data set and to match the wild file with one or more of a plurality of stored fingerprints for previously processed data sets to identify one or more of the previously processed data sets from which the data set originated; and
   a guilt assignment routine configured to generate a statistical probability that a particular third party was the source of the wild file.

16. The system of claim 15, wherein the recognition routine is configured to apply change fingerprinting to reduce the number of possible data sets in an evaluation set to be compared with the wild file to just those data sets with a corresponding time frame.

17. The system of claim 15, wherein the recognition routine is further configured to check at least one record of the wild file for the presence of a watermark.

18. The system of claim 17, wherein the recognition routine is further configured to:
   randomly select a subset of records in the wild file;
   compare the randomly selected subset of records in the wild file for a match with a watermark; and
   repeat the steps of randomly selecting a subset of records in the wild file and comparing the randomly selected subset of records in the wild file for a match with a watermark until either all records are scanned or a watermark match is found.

* * * * *